US008549630B2

(12) United States Patent
Villasenor et al.

(10) Patent No.: US 8,549,630 B2
(45) Date of Patent: Oct. 1, 2013

(54) TROJAN-RESISTANT BUS ARCHITECTURE AND METHODS

(75) Inventors: John D Villasenor, San Francisco, CA (US); Lok Won Kim, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 253 days.

(21) Appl. No.: 13/042,233

(22) Filed: Mar. 7, 2011

(65) Prior Publication Data

US 2011/0225651 A1 Sep. 15, 2011

Related U.S. Application Data

(60) Provisional application No. 61/311,229, filed on Mar. 5, 2010.

(51) Int. Cl.
*G06F 12/14* (2006.01)
*G06K 5/04* (2006.01)

(52) U.S. Cl.
USPC ............................................ 726/22; 714/699

(58) Field of Classification Search
USPC .................. 726/22; 711/110, 200; 710/305; 714/4.5, 6.21, 699
See application file for complete search history.

(56) References Cited

U.S. PATENT DOCUMENTS 5,572,734 A * 11/1996 Narad et al. ................... 710/200
6,832,280 B2 * 12/2004 Malik et al. ................... 710/200
6,832,335 B2 * 12/2004 Brooks ............................ 714/28

OTHER PUBLICATIONS

Lok-Won Kim, John D. Villasenor and Cetin K Koc, "A Trojan-resistant system-on-chip bus architecture," Proceedings of IEEE Military Communication (MILCOM) 2009, Boston. Oct. 2009.
F. Wolff, C. Papachristou, S. Bhunia, and R. Chakraboty, "Towards Trojan-free trusted ICs problem analysis and dectection scheme," in Proceedings, Design Automation and Test in Europe (Date '09), Munich, Germany Mar. 10-14, 2008, pp. 1362-1365.
S. T. King, J. Tucek, A. Cozzie, C. Grier, W. Jiang, and Y. Zhou, "Designing and implementing malicious hardware," in Proceedings of the 1st Usenix Workshop on Large-Scale Exploits and Emergent Threats (LEET), San Francisco, California: USENIX Association, 2008, pp. 1-8.
D. Agrawal, S. Baktir, D. Karakoyunlu, P. Rohatgi, and B. Sunar, "Trojan detection using IC fingerprinting," in IEEE Symposium on Security and Privacy (SP'07), 2007, pp. 296-310.

(Continued)

*Primary Examiner* — Nathan Flynn
*Assistant Examiner* — Abdullah Almamun
(74) *Attorney, Agent, or Firm* — Cislo & Thomas, LLP (57) ABSTRACT

A method of securing bus architecture from a Trojan attack. A restricted address access detector generates an unauthorized access detection signal when a master ID signal is within a restricted range. The unauthorized access detection signal disables the requested slave select signal, and the address decoder instead outputs a default slave select signal. A counter determines the duration of a lock signal from a master, and a comparator activates a malicious bus lock signal if the lock signal duration exceeds a threshold. The master mask register forcibly gates the lock signal upon receipt of the malicious bus lock signal. If the duration of a wait request from a slave exceeds a maximum duration register value, a comparator activates a malicious wait detection signal to disable the wait request signal. The method might include storing identifying information about the malicious master and storing a slave ID corresponding to the malicious slave.

11 Claims, 9 Drawing Sheets

(56) References Cited

OTHER PUBLICATIONS

X. Wang, H. Salmani, M. Tehranipoor, and J. Plusquellic, "Hardware Trojan detection and isolation using current integration and localized current analysis," in IEEE International Symposium on Defect and Fault Tolerance of VLSI Systems (DFTVS'08), 2008, pp. 87-95.

X. Wang, M. Tehranipoor, and J. Plusquellic, "Detecting malicious inclusions in secure hardware: Challenges and solutions," in IEEE International Workshop on Hardware-Oriented Security and Trust (HOST'08), 2008, pp. 15-19.

Y. Jin and Y. Makris, "Hardware Trojan detection using path delay fingerprint," in IEEE International Workshop on Hardware-Oriented Security and Trust (HOST'08), 2008, pp. 51-57.

R. Rad, J. Plusquellic, and M. Tehrainpoor, "Sensitivity analysis to hardware Trojans using power supply transient signals," in IEEE International Workshop on Hardware-Oriented Security and Trust (HOST'08), 2008, pp. 3-7.

M. Banga and M. S. Hsiao, "A novel sustained vector technique for the detection of hardware Trojans," in 22nd International Conference on VLSI Design, 2009, pp. 327-332.

T. Kean, D. McLaren, and C. Marsh, "Verifying the authenticity of chip designs with the Design Tag system," in IEEE International Workshop on Hardware-Oriented Security and Trust (HOST'08), 2008, pp. 59-64.

R. S. Chakraboty, S. Paul, and S. Bhunia, "On-demand transparency for improving hardware Trojan detectability," in IEEE International Workshop on Hardware-Oriented Security and Trust (HOST'08), 2008, pp. 48-50.

John Villasenor, "The Hacker in Your Hardware", Scientific American, pp. 82-87, Aug. 2010.

Old Trick Threatens the Newest Weapons, by John Markoff, The New York Times. Oct. 26, 2009, http://www.nytimes.com/2009/10/27/science/27trojan.html.

"Securing the Information Highway", by Gen. Wesley Clark and Peter Levin, Foreign Affairs, Nov./Dec. 2009 issue.

"Trojan Detection using IC Fingerprinting", D. Agrawal, S. Baktir, D. Karakoyunlu, P. Rohatgi, and B. Sunar, Proceedings of the 2007 IEEE Symposium on Security and Privacy (SP'07), 2007, pp. 296-310.

Lok-Won Kim, and John D Villasenor, "A System-On-Chip Bus Architecture for Thwarting Integrated Circuit Trojan Horses", to appear in IEEE Transactions on VLSI Systems.

Defense Science Board Task Force on High Performance Microchip Supply Feb. 2005 Office of the Under Secretary of Defense for Acquisition. Technology, and Logistics Washington. D.C. 20301-3140 (available at http://www.acq.osd.mil/dsb/reports/ADA435563.pdf).

M. Abramovici and P. L. Levin, "Protecting integrated circuits from silicon Trojan horses," Jan./Feb. 2009, http://www.mil-embedded.com/articles/id/?3748.

J. Li and J. Lach, "At-speed delay characterization for IC authentication and Trojan horse detection," in IEEE International Workshop on Hardware-Oriented Security and Trust (HOST'08), 2008, pp. 8-14.

\* cited by examiner

TROJAN-RESISTANT BUS ARCHITECTURE AND METHODS

CROSS-REFERENCES TO RELATED APPLICATIONS

This patent application claims the benefit of U.S. Provisional Patent Application Ser. No. 61/311,229 filed Mar. 5, 2010 for Trojan-Resistant Bus Architecture and Methods. That application is incorporated here by this reference.

TECHNICAL FIELD

This invention relates to integrated circuit design, particularly designs for protecting the system bus architecture from Trojan attacks.

BACKGROUND ART

Communications systems are increasingly reliant on system-on-chip (SoC) solutions. As the complexity and size of SoCs continues to grow, so does the risk of "Trojan" attacks, in which an integrated circuit (IC) design is surreptitiously and maliciously altered at some point during the design or manufacturing process. Despite the risks that such an attack entail, relatively little attention has been given in the literature to methods enabling detection of and response to run-time Trojan attacks. In the present paper, we present a Trojan-resistant system bus architecture suitable across a wide range of SoC bus systems. The system detects malicious bus behaviors associated with Trojan hardware, protects the system and system bus from them and reports the malicious behaviors to the CPU. Use of this bus and associated embedded software is highly effective in reducing IC Trojan vulnerabilities without loss of bus performance.

Silicon systems in general and communications SoCs in particular are getting exponentially more complex, harder to test, and interdependent. Such systems increasingly involve third party intellectual property (IP) designs and are increasingly reliant on outsourced and/or offshore aspects in the design and manufacturing process. With more and more of the system design steps occurring in environments where it is difficult to ensure the security of the design, there is a growing threat of "Trojan" attacks, in which an integrated circuit (IC) design is surreptitiously and maliciously altered at some point during the design or manufacturing process.

While the threat of Trojan ICs has received increasing attention in recent years, most anti-Trojan efforts are directed at identifying Trojans during verification and testing, prior to silicon deployment. For example, there is a class of techniques based on comparing measured physical characteristics such as power consumption, timing variations, and layout structures with respect to a "golden model" deemed to be trustworthy. There are also attempts to design "malicious hardware" in order to demonstrate how significant large-scale attacks can be mounted by the help of hardware. Other methods rely on adding logic which is used to identify authentic chips or test original designs to identify functional defects that may have malicious origins. These approaches, while they are an important part of an overall mitigation strategy, are far from comprehensive in SoC and SiP (System in Package) applications.

For example, when third party IP designs are provided using register transfer level (RTL) descriptions, it is likely that there will be no trusted golden model to use for comparison. In addition, the use of increasingly complicated SoC, SiP and MCP (Multi-chip-package) designs provides a would-be attacker with multiple opportunities for the insertion of Trojans, including front-end logic design, floor planning, place-and-route, mask creation, large scale manufacturing, and packaging. Even if all the constituent IP designs and chips are known to be trustworthy, an attacker could insert a malicious die during the manufacturing process. In this context, it is very difficult to reliably create a trustworthy system-level model against which production samples can be compared. In addition, traditional approaches would not be particularly effective at identifying a true Trojan—an attack designed to remain hidden and inactive until triggered either internally or externally.

DISCLOSURE OF INVENTION

While there are many aspects of an SoC that could be targeted by a would-be attacker, in the present paper we consider the specific issue of bus arbitration, which is obviously critical to the overall system operation. The bus arbitration process represents one of the most significant points of vulnerability to run-time Trojans because it is the step that allows master devices (such as processor, different DMA controllers for different communication blocks, various I/O interface blocks) to have access to slave devices (memory controllers, UART, timers, etc.). Once a device is granted mastership of the bus, it can retain this mastership for as long as desired. In systems in which the master devices are behaving cooperatively this is not a problem. However, a Trojan attacker could cause a master device to maintain a lock on the bus for arbitrarily long periods of time. The system could continue in the power-on state, but would be locked and unable to function normally.

To the best of our knowledge, these aspects of IC Trojan protection have not been addressed before. More specifically, we address (a) real-time Trojan attacks and real-time protections against such attacks, and (b) system protection via a Trojan resistant SoC bus architecture. Our disclosed architecture accomplishes protection without incurring high costs in terms of bus resources and performance.

Accordingly, one aspect of the invention can be described as a method of securing a conventional address decoder connected to a CPU from a Trojan attack of a malicious master and a malicious slave. The conventional address decoder receives an address signal from a master device having a master ID signal, and the conventional address decoder outputs a requested slave select signal to a requested slave device. The requested slave device generates a slave response signal.

The method of securing the conventional address decoder includes the steps of defining a restricted address range; an unauthorized access detection signal disabling the requested slave select signal; and the conventional address decoder outputting a default slave select signal instead of the requested slave select signal. The restricted address access detector compares the master ID signal to the restricted address range. The restricted address access detector generates an unauthorized access detection signal when the master ID signal is within the restricted address range.

In a version of the invention, the method of securing the conventional address decoder also includes an interrupt controller receiving the unauthorized access detection signal from the restricted address access detector and sending an interrupt signal to the CPU. Following receipt of the interrupt signal, the CPU may initiate an interrupt service routine to determine identifying information about the malicious master and the unauthorized access address and to institute a countermeasure. The countermeasure might include activating a power gate to cut power to the malicious master or the malicious slave.

In some versions, the method of securing the conventional address decoder also includes storing the identifying information about the malicious master in a malicious master mask register. The method might also include the step of a malicious slave mask register receiving the slave response signal and storing a slave ID corresponding to the malicious slave.

If the malicious slave mask register receives a malicious slave detection signal, the method might also the steps of (a) storing identifying information about the malicious slave in the malicious slave mask register; (b) disabling the requested slave select signal; and (c) the conventional address decoder outputting the default slave select signal instead of the requested slave select signal.

Another aspect of the invention can be described as a method of securing a conventional bus arbiter from a Trojan attack of a malicious master. The conventional bus arbiter receives a lock signal from a master device having a master ID. The lock signal has an active time.

A counter receives the lock signal and a system clock signal, and the system clock signal comprises a number of clock cycles. The counter counts the number of clock cycles during the active time of the lock signal to determine a lock signal duration. A comparator compares the lock signal duration to a duration threshold, and the comparator activates a malicious bus lock signal if the lock signal duration exceeds the duration threshold. A master mask register forcibly gates the lock signal upon receipt of the malicious bus lock signal.

In a version of the invention, the method of securing a conventional bus arbiter also includes the step of saving the master ID of the master device into the Trojan master mask register. In a version of the invention, the conventional bus arbiter returns to a normal operation mode after the gating of the lock signal.

Yet another aspect of the invention can be described as a method of securing a bus matrix from a Trojan attack of a malicious slave. The bus matrix receives a wait request signal from a slave device having a slave ID, and the wait request signal has a wait request signal duration. The method of securing a bus matrix includes the step of a comparator comparing the wait request signal duration to a maximum duration register value. When the wait request signal duration exceeds the maximum duration register value, (i) the comparator activates a malicious wait detection signal, and (ii) the malicious wait detection signal disables the wait request signal.

In a version of the invention, the method of securing a bus matrix also includes the step of a counter receiving a system clock signal and the wait request signal. The wait request signal has an active time, and the system clock signal comprises a number of clock cycles. The counter counts the number of clock cycles during the active time of the wait request signal to determine the wait request signal duration.

In some embodiments, when the wait request signal duration exceeds the maximum duration register value, the malicious wait detection signal is a latch enable signal for a malicious slave mask register to store the slave ID.

These three aspects (securing a conventional address decoder, securing a conventional bus arbiter, and securing a bus matrix), individually or in combinations of two or three of them, can be used to protect a system bus architecture from a Trojan attack.

BEST MODE FOR CARRYING OUT THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Normal SoC Bus Structure and Operation

Figure 1:
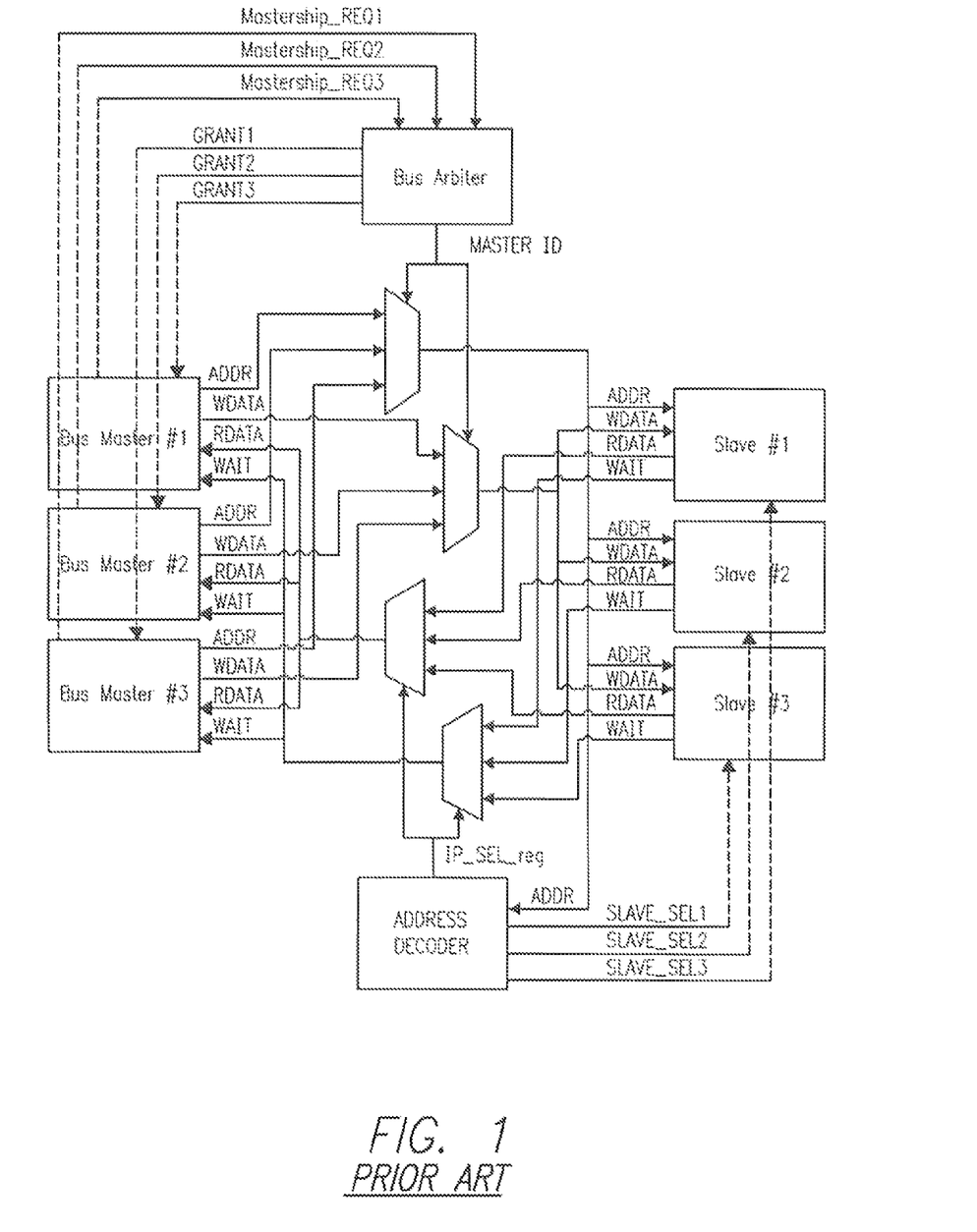
FIG. 1 is a high-level view of conventional SoC bus interconnections, showing master and slave devices, an arbiter, an address decoder, and various multiplexers.

While an SoC bus is not a real physical bus, it performs the functions associated with a physical bus of interconnecting a processing core to the surrounding interface logic. Examples of SoC buses include AMBA (Advanced Micro-controller Bus Architecture) from ARM. CoreConnect from IBM, Avalon Bus Specification from Altera, Wishbone from Opencores, and STBus from STMicroelectronics. While each bus is characterized by different architectures, performances, advantages and protocols, they address the similar function of mediating bus mastership in multiple bus master environments. This involves translating incoming addresses from a current master into selection signals to slave IPs, transferring data from a selected slave IP to a current master or from the master to the slave, and bridging between multiple bus levels. FIG. 1 shows a conventional bus arbiter connected, in this example, to three master devices and three slave devices. A device desiring bus mastership can issue a request using its Mastership REQ line. If mastership is granted, the arbiter will inform the requesting device using the appropriate GRANT line, and simultaneously, will set MASTER ID so that the multiplexors will allow signals from the selected master to be provided to the slave devices. Each master also has a LOCK signal that it can optionally assert when it needs to hold bus mastership exclusively. Such a need can arise, for example, when there is a time constraint that forces the master device to complete a task (such as transferring a received packet from local buffer to main memory) immediately. When the bus is locked, the arbiter informs the other potential master devices using the MASTER LOCK signal. In cases where the master is performing a less time-critical task, such as when the CPU is fetching an instruction from memory, the CPU will typically not assert LOCK. This allows the arbiter to take mastership away from the CPU and grant it to a different device, such as a modem, should a time-critical task arise.

In a normally operating bus system, mastership passes among different devices in accordance with the arrival of data and the various demands and priorities of the master devices. In a Trojan attack, however, a malicious master could request and receive bus mastership, and then proceed to lock the bus for an indefinite period of time. Once in control of the bus, it could halt the system by blocking the CPU from fetching code instructions and loading data. In addition, it could access normally restricted system addresses in order to gain access to confidential and control system operating modes.

Address Decoder

Figure 2:
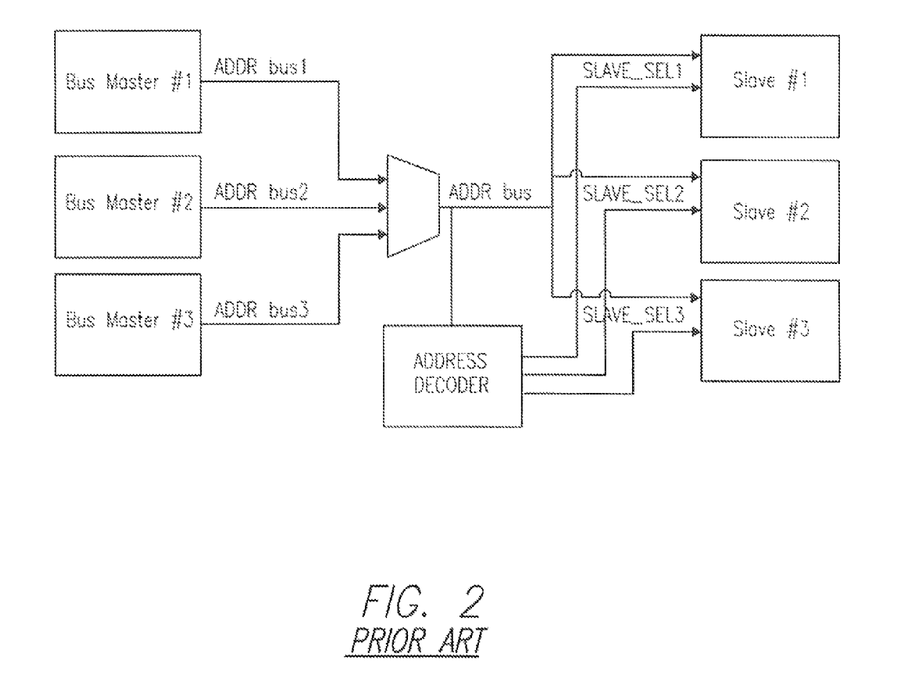
FIG. 2 is a conventional address decoder and its connection. The decoder examines the MSBs of the address and selects the appropriate slave.

The function of an address decoder is to receive address signals arriving from a master and to make a selection of an appropriate slave device. FIG. 2 shows an example of the conventional (in this case based on AMBA) address and address decoding connections. The decoder logic contains combinatorial logic to examine the most significant bits (MSBs) of the address and activate the corresponding slave block. For example, if the MSBs indicate an address corresponding to Slave #1, the address decoder will set the SLAVE SEL1 signal appropriately so that the MSBs will be used to read data from Slave #1.

Figure 3:
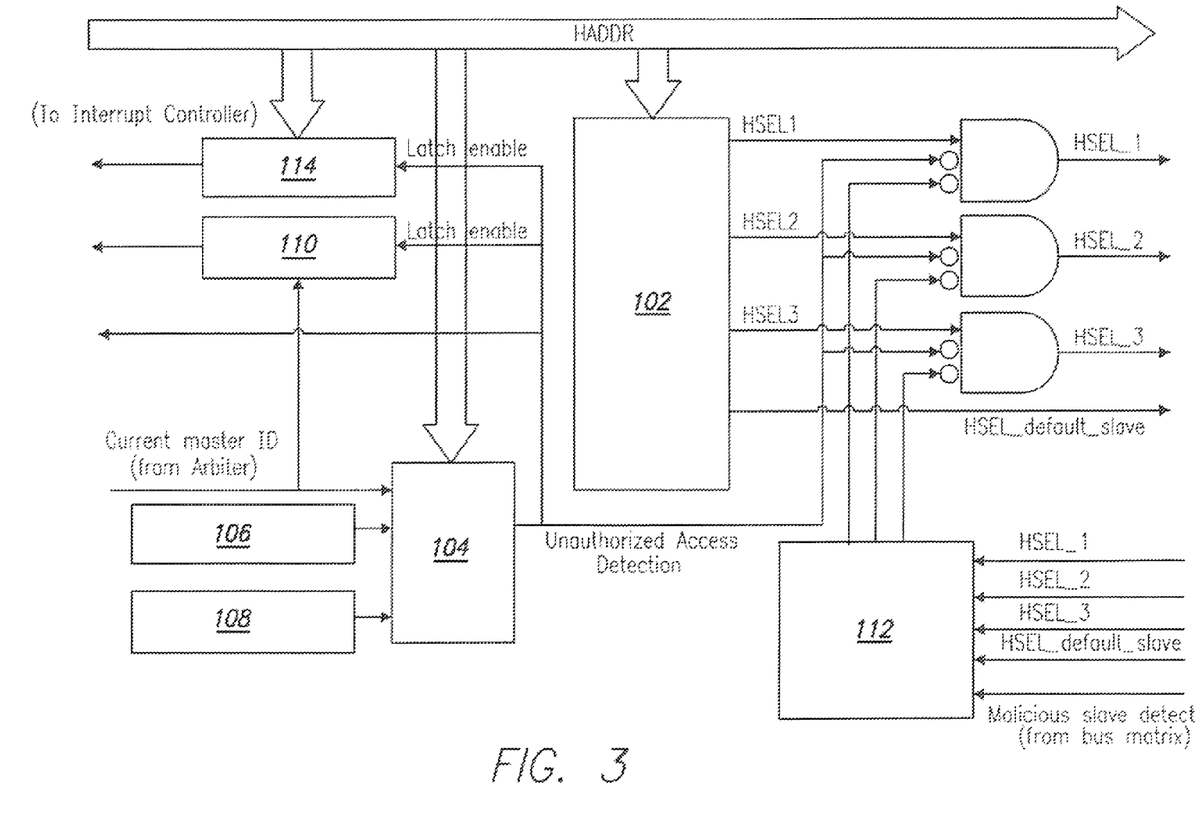
FIG. 3 is a version of the disclosed secure address decoder.

FIG. 3 shows a secure address decoder containing a conventional address decoder as well as additional logic to (a) detect an attempt by a malicious bus master to access a restricted address, and (b) block normal masters from inadvertently accessing malicious slaves. The "Restricted Address Start Register" and "Restricted Address End Register" contain address values to define restricted address ranges. The embedded software configures these values in an initialization, step or dynamically re-configures them in run-time. The comparator receives address signals from the master, compares them with the restricted address register and, upon detection of an unauthorized access attempt, generates an "Unauthorized Access Detection" signal that disables all the slave select signals except for a single default slave. The Unauthorized Access Detection signal is also connected to the interrupt controller as an interrupt source so that the CPU can handle the malicious behavior accordingly. The CPU initiates an interrupt service routine to identify information about the malicious master and the unauthorized access address, and initiates an appropriate countermeasure. In addition, the identity of the malicious master is stored in the malicious master mask register so that future attempts to obtain bus mastership can be handled accordingly.

The secure address decoder also blocks access by normal masters to malicious slaves. A malicious slave could attempt to halt bus operation through continuously asserting a wait. This behavior can be detected using the bus multiplexor which connects slave response signals to a master, and information regarding the malicious slave information is recorded into the malicious slave mask register. The Trojan slave mask value disables bus connection of the Trojan slave to working masters. When a master attempts to access a malicious slave, the address decoder instead diverts the access into a default slave containing empty address ranges, thus effectively excluding the malicious slave block from the bus system.

Arbiter

Figure 4:
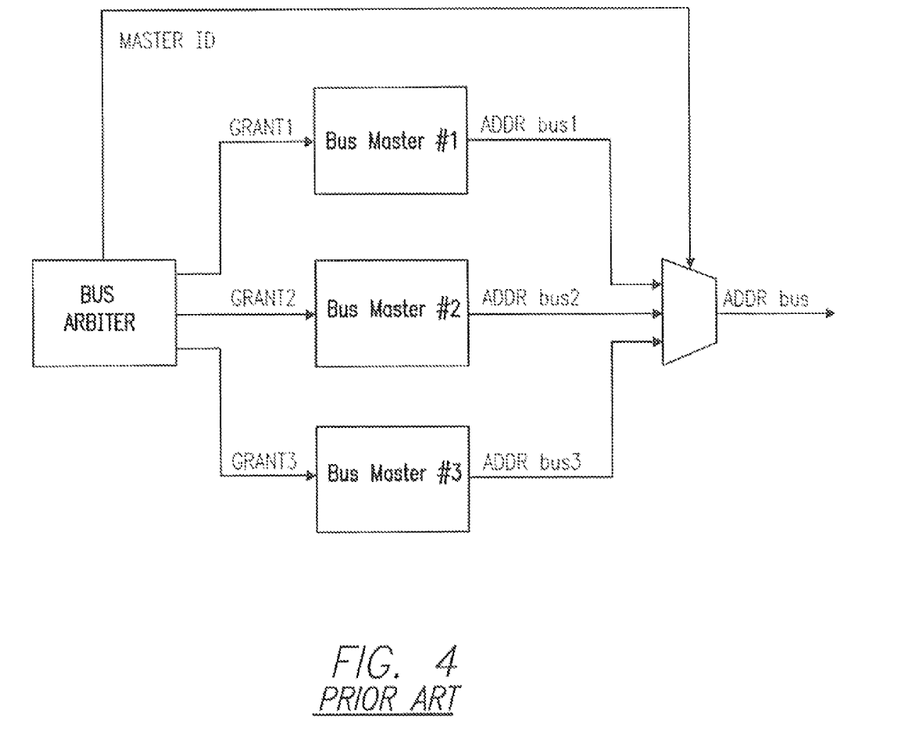
FIG. 4 shows the grant signals and address multiplexor connections of a conventional bus standard.

As noted earlier, an arbiter is used to ensure that only one master has access to the bus at a time. The arbiter performs this function by observing (possibly simultaneous) bus-mastership requests to use the bus, deciding Which requester has the highest priority, and granting mastership to one master at a time. There are multiple methods for bus arbitration, including round-robin, fixed priority, or a combination of round-robin and fixed priority. FIG. 4 shows the grant signals and address multiplexor connections of a conventional bus standard. Upon receiving a grant signal from the arbiter, the selected master can then provide an address via the multiplexor to an appropriate slave. The arbiter also provides MASTER ID signals to the multiplexor to ensure the ADDR information from the selected master is provided to the slaves.

Figure 5:
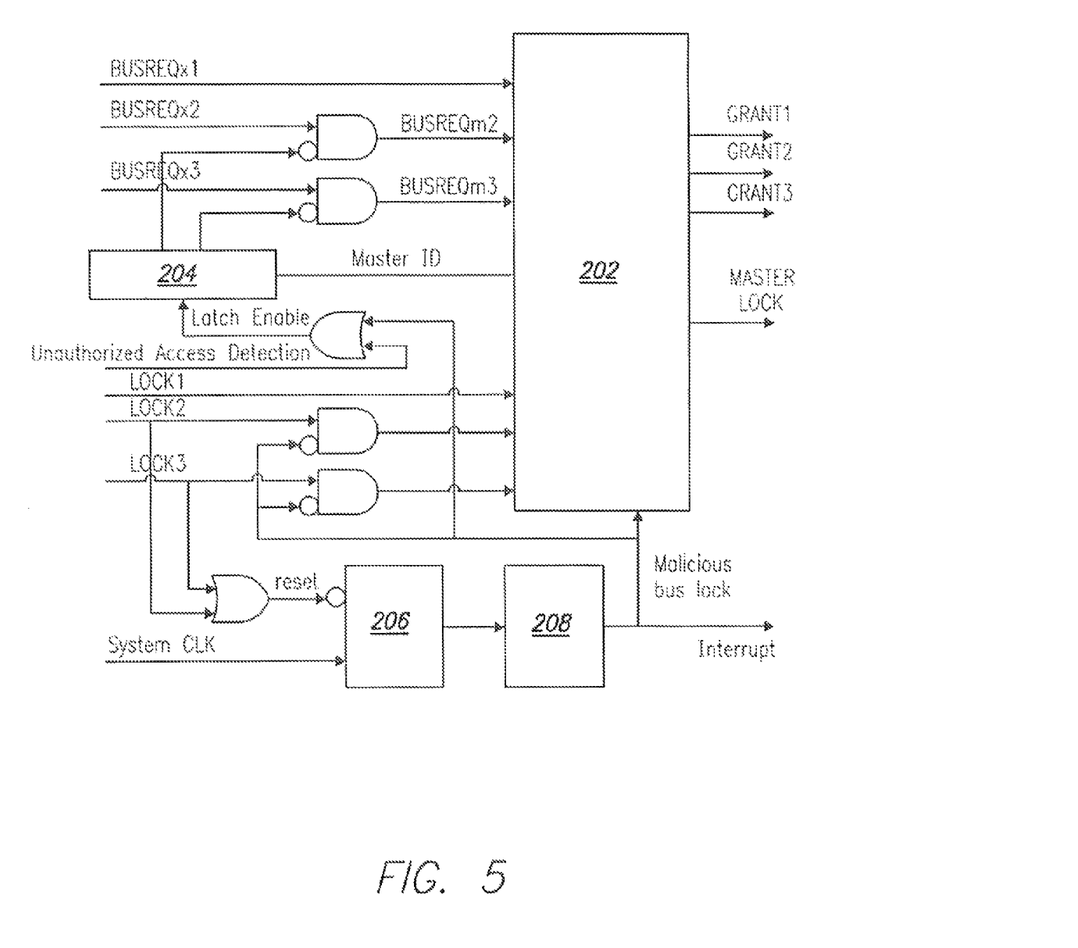
FIG. 5 is a version of the disclosed arbiter.

FIG. 5 shows the proposed arbiter. The arbiter contains a register, counter, and combinatorial logic and performs the functions of (a) detecting and nullifying malicious bus locking by a Trojan master, and (b) avoiding grants of bus mastership to known Trojan masters.

In principle, the bus master lock is used to protect data integrity when a master needs to perform a time-constrained transfer through the bus. However, a Trojan master could obtain exclusive possession of the bus mastership through improper use of the LOCK bus signal. This would exclude other masters from gaining access to the bus and would also prevent an interrupt from being used to switch bus mastership. To address this, several logic functions are included in the arbiter of FIG. 5. A counter counts the number of clocks for which LOCK signals are active during each use of the bus by a master. When the counter exceeds a threshold, a malicious bus lock signal is activated. The threshold can be set on an application-specific basis, and can also be updated adaptively during operation as a function of specific SoC conditions, thus minimizing the probability of a false alarm. The updated threshold values are calculated by system architects through system performance analysis in pre-deployment or post-deployment. Upon activation of the malicious bus lock signal, the master mask register forcibly gates the lock and request signals and the arbiter returns to normal operation. The arbiter of FIG. 5 also receives the Unauthorized Access Detection signal from the address decoder as explained above. The arbiter saves the master ID of the malicious master into the master mask register, so that future attempts by this master to access the bus can be denied.

Bus Matrix

Figure 6:
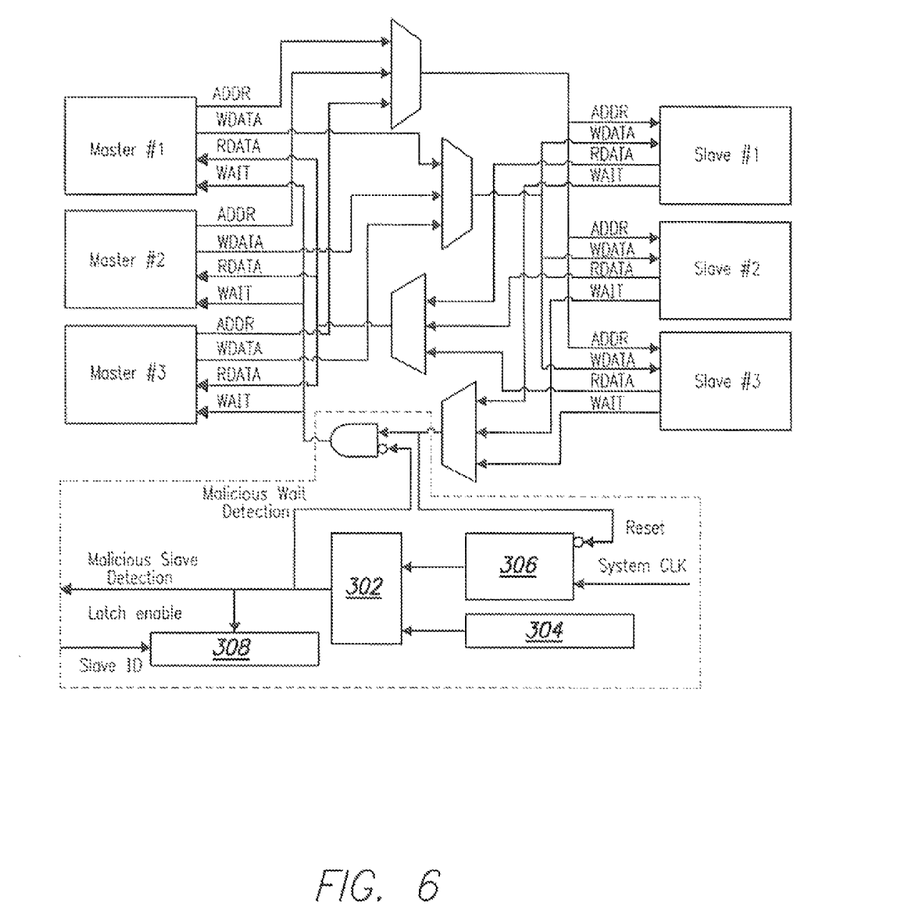
FIG. 6 is a version of the disclosed bus matrix.

FIG. 6 shows a secure bus matrix. In a normally operating bus system, the bus matrix enables the connection between the appropriate master and slave signals in accordance with the signals from the arbiter and decoder, passing data, address, and transaction status. The secure bus matrix detects, blocks, and reports malicious wait signals from a Trojan slave. When a slave needs additional time to finish a data writing or reading operation instructed by the master, it can assert the wait signal so that the master knows to wait for completion. For example, if the bus is running at 200 MHz and memory access is clocked at 50 MHz, the memory controller can assert the wait signal for four clock cycles when a master needs to read from or write to memory. A Trojan IC could utilize the wait signal to halt the system, thus forcing the master to wait indefinitely and preventing the arbiter from switching mastership. In the bus matrix shown in FIG. 6, a counter is used to detect a malicious wait in a manner analogous to the counter described above for detecting malicious bus lock. When the wait exceeds a threshold, a malicious wait signal is generated and used to nullify the wait signal. The malicious wait signal is also used as a latch enable signal for the malicious slave mask register to identify the current slave as malicious. The threshold values are calculated by system architects through system performance estimation, too.

Post-Detection SoC Operation

The approaches described above enable detection of Trojan behavior and temporary or permanent quarantining of master or slave devices known to be malicious. However, if the act of excluding a malicious master or slave leaves the SoC unable to function, the Trojan attack will still have succeeding in halting the system. Thus, it is important not only to quarantine malicious devices, but to maximize the ability of the SoC to continue operation despite the presence of a Trojan. The appropriate response depends strongly on the specific nature of the Trojan.

Figure 7:
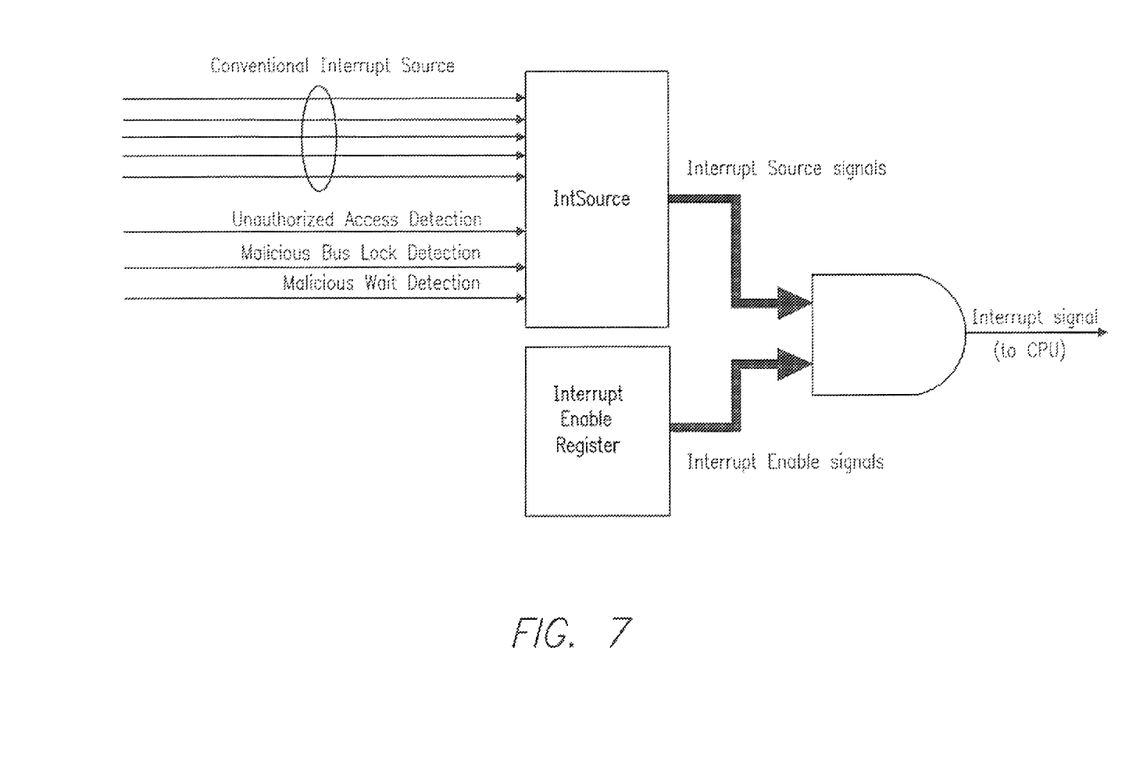
FIG. 7 is an interrupt controller, modified to handle signals identifying the presence of a Trojan.

In addition to their uses in blocking malicious masters and slaves, the "Unauthorized Access Detection," "Malicious Bus Lock Detection," and "Malicious Wait Detection" signals can also be used in conjunction with the system interrupt. FIG. 7 shows a simplified interrupt controller which connects the detection signals as interrupt sources. When a malicious behavior is detected in One of the proposed bus components, at first the behavior is temporarily blocked. The corresponding detection signal triggers a system interrupt, causing the CPU to jump to a vector address corresponding to an appropriate interrupt handler routine. In the interrupt handler routine, the CPU utilizes a specific interrupt service routine corresponding to the detection signal. Actions taken can include reporting malicious behaviors to users or host systems.

Figure 8:
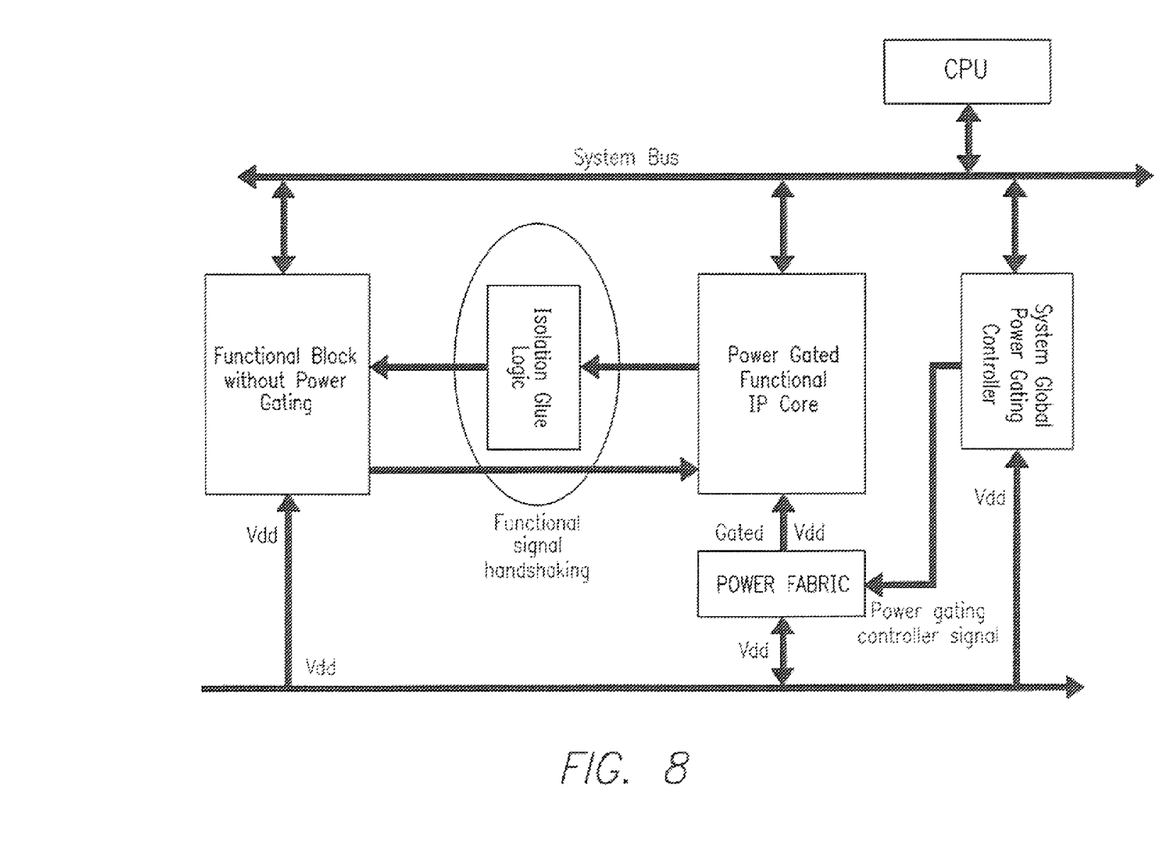
FIG. 8 is an SoC architecture with power gating.

In addition, or alternatively, the CPU can assert the reset signal of the Trojan IC block to initialize all registers inside the block, turn on clock gating on the block to halt the Trojan block's operation, or turn on power gating on the block to power down every element of the Trojan block. FIG. 8 shows a block diagram of an SoC with power gating. The Power Switching Fabric includes a unified VDD mesh for the Power Gated Functional Block. This isolates the functional block from power sources using the Power Gating Controller. When the block goes into power gated status, output signals of the power gated block must be tied to Vdd or GND. Otherwise, a block which receives the signals as input signals may experience problems because of the floating inputs. The Isol block performs the appropriate signal ties to handle this.

Design Experiments

Figure 9:
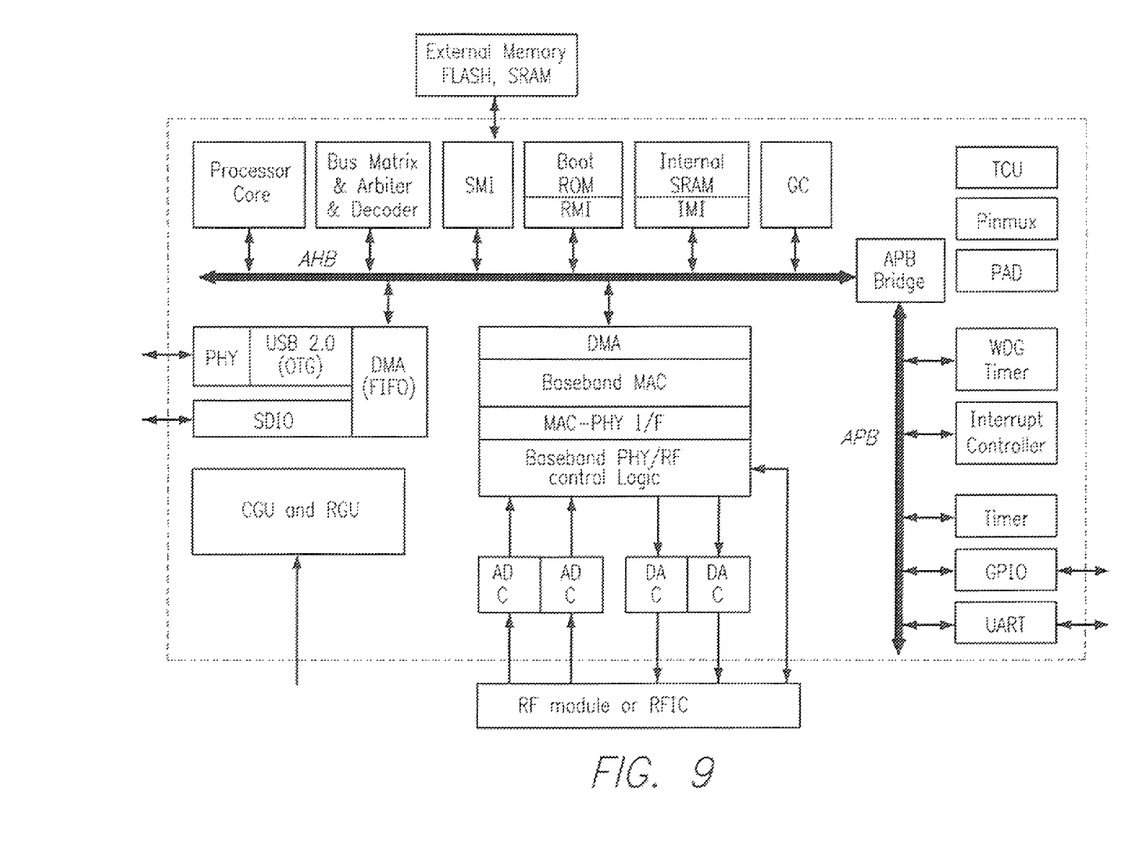
FIG. 9 depicts the AMBA-based SoC used for experiments. This SoC contains approximately 4 million logic gates.

To explore the hardware costs of some of the approaches described above, the AMBA-based SoC shown in FIG. 9 was used. We chose the AMBA AHB from ARM because it is a very widely used SoC bus. The SoC in FIG. 9 contains approximately 4 million logic gates and includes a processor core, SoC bus components, various memory controllers, various interface blocks, a baseband processor, timers, interrupt controller, general purpose IO and UART.

The RTL description of the system was synthesized using a 90 nm technology library. The processing core and system bus operates at 132 MHz. The number of standard cells used in this SoC is 574,472, and the total number of logic gates is 4,010,814. Table I shows the area distribution of the SoC.

TABLE I

| Area | Soft/Hard Macros | Pads | Standard Cells | Total Chip Size |
|---|---|---|---|---|
| (mm²) | 14.028 | 2.736 | 6.631 | 29.89 |

Table II shows the additional gate count costs associated with the various techniques described earlier. As the table shows, the total increase in gate count is less than 500 for the implementation used here.

TABLE II

| Function | Additional Gate Count |
|---|---|
| Arbiter | 124 |
| Address decoder | 116 |
| Bus matrix | 186 |
| Total additional gates | 426 |

It is also important to consider the potential for delays that may be introduced by this additional logic. For the modified address decoder, there is a delay due to the three-input AND gate in addition to the delay from conventional address decoding. The new arbiter and bus matrix each contain an additional two-input AND gate with its associated delay.

All of the above delays are negligible in the context of the overall SoC design. In the overwhelming majority of cases, the additional delay would not have any impact on the ability to meet performance constraints. In the unlikely event that the ability to meet these constraints is impacted, this can be automatically handled in the synthesis stage through the use of faster logic gates.

An AMBA-based development emulation card was used for implementation. The anti-Trojan logic elements listed in Table II were designed in RTL and mapped to this board. Various virtual attacks were implemented to, for example, attempt to access restricted address ranges and assert continuous lock and wait signals during processing. On this emulation card and in RTL simulation, the detection, mitigation, and system interrupt functions to detect and mitigate these attacks were successfully verified.

Thus, we presented a bus architecture that is resilient to Trojan attacks. By constructing the new bus architecture around a core of traditional bus elements such as the arbiter, address decoder, bus matrix, etc., the design remains compatible with traditional systems. Mechanisms were presented to identify malicious attempts at bus locking, unauthorized memory accesses, and malicious use of wait signals which, if left undetected, could freeze the operation of the entire SoC. Master and slave devices engaging in malicious behavior are identified and quarantined. Depending on the nature of the Trojan attack, the operation of the SoC can be modified on the fly, thereby enabling the SoC to continue to maintain full or partial functionality despite the attack.

Accordingly, and with reference to FIG. 3 in particular, one aspect of the invention can be described as a method of securing a conventional address decoder 102 connected to a CPU from a Trojan attack of a malicious master and a malicious slave. The conventional address decoder receives an address signal from a master device having a master ID signal, and the conventional address decoder outputs a requested slave select signal to a requested slave device. The requested slave device generates a slave response signal.

The method of securing the conventional address decoder includes the steps of (a) defining a restricted address range; (b) a restricted address access detector 104 comparing the master ID signal to the restricted address range; (c) the unauthorized access detection signal disabling the requested slave select signal and (d) the conventional address decoder outputting a default slave select signal instead of the requested slave select signal.

The restricted address access detector generates an unauthorized access detection signal when the master ID signal is within the restricted address range. The master device is deemed to be a malicious master when the master ID signal is within the restricted address range. Likewise, the master ID signal is deemed to be an unauthorized access address when the master ID signal is within the restricted address range.

In a version of the invention, the method also includes a restricted address start register 106 containing a start address value and a restricted address end register 108 containing an end address value. The start address value and the end address value together define the bounds for the restricted address range. Preferably, the restricted address access detector 104 is in communication with the restricted address start register 106 and the restricted address end register 108 to receive the restricted address range.

In a version of the invention, the method also includes an arbiter transmitting the master ID signal from the master device to the restricted address access detector.

In a version of the invention, an interrupt controller receives the unauthorized access detection signal from the restricted address access detector 104 and sends an interrupt signal to the CPU. Following receipt of the interrupt signal, the CPU may initiate an interrupt service routine. The interrupt service routine may determine identifying information about the malicious master and the unauthorized access address. Also, the interrupt service routine may initiate a countermeasure. In some versions of the invention, the countermeasure includes activating a power gate to cut power to the malicious master or the malicious slave.

In some embodiments, the method also includes storing the identifying information about the malicious master in a malicious master mask register 110. In some versions, the method also includes the step of a malicious slave mask register 112 receiving the slave response signal and storing a slave ID corresponding to the malicious slave. The system might also include an accessed address register 114 as shown in FIG. 3.

If the malicious slave mask register 110 receives a malicious slave detection signal, the method might also the steps of (a) storing identifying information about the malicious slave in the malicious slave mask register 112; (b) disabling the requested slave select signal; and (c) the conventional address decoder 102 outputting the default slave select signal instead of the requested slave select signal. The default slave select signal accesses a default slave device that contains empty address ranges.

With particular reference to FIG. 5, another aspect of the invention can be described as a method of securing a conventional bus arbiter 202 from a Trojan attack of a malicious master. The conventional bus arbiter 202 receives a lock signal from a master device having a master ID. The lock signal has an active time.

A counter 206 receives the lock signal and a system clock signal, and the system clock signal comprises a number of clock cycles. The counter 206 counts the number of clock cycles during the active time of the lock signal to determine a lock signal duration. A comparator 208 compares the lock signal duration to a duration threshold, and the comparator 208 activates a malicious bus lock signal if the lock signal duration exceeds the duration threshold. A master mask register 204 forcibly gates the lock signal upon receipt of the malicious bus lock signal.

In a version of the invention, the method also includes the step of saving the master ID of the master device into the Trojan master mask register 204. In a version of the invention, the conventional bus arbiter 202 returns to a normal operation mode after the gating of the lock signal.

With particular reference to FIG. 6, yet another aspect of the invention can be described as a method of securing a bus matrix from a Trojan attack of a malicious slave. The bus matrix receives a wait request signal from a slave device having a slave ID, and the wait request signal having a wait request signal duration. The method includes the step of a comparator 302 comparing the wait request signal duration to a maximum duration register value. When the wait request signal duration exceeds the maximum duration register value, (i) the comparator 302 activates a malicious wait detection signal, and (ii) the malicious wait detection signal disables the wait request signal.

In a version of the invention, the method also includes the step of a counter 306 receiving a system clock signal and the wait request signal. The wait request signal has an active time, and the system clock signal comprises a number of clock cycles. The counter 306 counts the number of clock cycles during the active time of the wait request signal to determine the wait request signal duration.

In some embodiments, when the wait request signal duration exceeds the maximum duration register value, the malicious wait detection signal is a latch enable signal for a malicious slave mask register 308 to store the slave ID.

While the present invention has been described with regards to particular embodiments and versions, it is recognized that additional variations of the present invention may be devised without departing from the inventive concept.

REFERENCES

[1] Lok-Won Kim, John D. Villasenor and Cetin K. Koc. "A Trojan-resistant system-on-chip bus architecture," Proceedings of IEEE Military Communication (MILCOM) 2009, Boston, October 2009.

[2] John Villasenor, "The Hacker in Your Hardware," Scientific American, pages 82-87, August 2010.

[3] Old Trick Threatens the Newest Weapons, by John Markoff, The NewYork Times, Oct. 26, 2009, http://www.nytimes.com/2009/10/27/science/27trojan.html.

[4] "Securing the Information Highway," by Gen. Wesley Clark and Peter Levin, Foreign Affairs, November/December 2009 issue.

[5] "Trojan Detection using IC Fingerprinting," D. Agrawal, S. Baktir, D. Karakoyunlu, P. Rohatgi, and B. Sunar, Proceedings of the 2007 IEEE Symposium on Security and Privacy (SP'07), 2007, pp. 296-310:

[6] Lok-Won Kim, and John D. Villasenor, "A System-On-Chip Bus Architecture for Thwarting Integrated Circuit Trojan Horses," to appear in IEEE Transactions on VLSI Systems.

[7] Defense Science Board Task Force On HIGH PERFORMANCE MICROCHIP SUPPLY February 2005 Office of the Under Secretary of Defense For Acquisition, Technology, and Logistics Washington, D.C. 20301-3140 (available at http://www.acq.osd.mil/dsb/reports/ADA435563.pdf)

[8] F. Wolff, C. Papachristou, S. Bhunia, and R. Chakraborty, "Towards Trojan-free trusted ICs: problem analysis and detection scheme," in Proceedings, Design Automation and Test in Europe (DATE'09), Munich, Germany, Mar. 10-14, 2008, pp. 1362-1365.

[9] S. T. King, J. Tucek, A. Cozzic, C. Grier, W. Jiang, and Y. Zhou, "Designing and implementing malicious hardware," in Proceedings of the 1st Usenix Workshop on Large-Scale Exploits and Emergent Threats (LEET). San Francisco, Calif.: USENIX Association 2008, pp. 1-8.

[10] D. Agrawal, S. Baktir, D. Karakoyunlu, P. Rohatgi, and B. Sunar, "Trojan detection using IC fingerprinting," in IEEE Symposium on Security and Privacy (SP'07), 2007, pp. 296-310.

[11] J. Li and J. Lach, "At-speed delay characterization for IC authentication and Trojan horse detection," in IEEE International Workshop on Hardware-Oriented Security and Trust (HOST'08), 2008, pp. 8-14.

[12] X. Wang, H. Salmani, M. Tehranipoor, and J. Plusquellic, "Hardware Trojan detection and isolation using current integration and localized current analysis," in IEEE International Symposium on Defect and Fault Tolerance of VLSI Systems (DFTVS'08), 2008, pp. 87-95.

[13] X. Wang, M. Tehranipoor, and J. Plusquellic, "Detecting malicious inclusions in secure hardware: Challenges and solutions," in IEEE International Workshop on Hardware-Oriented Security and Trust (HOST'08), 2008, pp. 15-19.

[14] Y. Jin and Y. Makris, "Hardware Trojan detection using path delay fingerprint," in IEEE International Workshop on Hardware-Oriented Security and Trust (HOST'08), 2008, pp. 51-57.

[15] R. Rad, J. Plusquellic, and M. Tehranipoor, "Sensitivity analysis to hardware Trojans using power supply transient signals," in IEEE International Workshop on Hardware-Oriented Security and Trust (HOST'08), 2008, pp. 3-7.

[16] M. Banga and M. S. Hsiao, "A novel sustained vector technique for the detection of hardware Trojans," in 22nd International Conference on VLSI Design, 2009, pp. 327-332.

[17] M. Abramovici and P. L. Levin, "Protecting integrated circuits from silicon Trojan horses," January/February 2009, http://www.mil-embedded.com/articles/id/?3748.

[18] T. Kean, D. McLaren, and C. Marsh, "Verifying the authenticity of chip designs with the DesignTag system," in IEEE International Workshop on Hardware-Oriented Security and Trust (HOST'08), 2008, pp. 59-64.

[19] R. S. Chakraborty, S. Paul, and S. Bhunia, "On-demand transparency for improving hardware Trojan detectability," in IEEE International Workshop on Hardware-Oriented Security and Trust (HOST'08), 2008, pp. 48-50.

INDUSTRIAL APPLICABILITY

This invention may be industrially applied to the development, manufacture, and use of integrated circuits and designs for protecting the system bus architecture from Trojan attacks.

What is claimed is:

1. A method for protecting a bus architecture connected to a CPU from a Trojan attack of a master device and a slave device comprising the steps of:
   (a) securing a conventional address decoder, where the conventional address decoder receives an address signal from the master device and outputs a requested slave select signal to a requested slave device, and where the requested slave device generates a slave response signal, the conventional address decoder being secured by:
      (i) providing a restricted address start register containing a start address value;
      (ii) providing a restricted address end register containing an end address value, the start address value and the end address value together defining a restricted address range bounded by the start address value and the end address value;
      (iii) providing a restricted address access detector;
      (iv) providing an arbiter transmitting a master ID signal from the master device to the restricted address access detector;
      (v) providing an interrupt controller in communication with the CPU;
      (vi) providing a malicious slave mask register, the malicious slave mask register receiving the slave response signal;
      (vii) the restricted address access detector receiving the master ID signal and being in communication with the restricted address start register and the restricted address end register;
      (viii) the restricted address access detector comparing the master ID signal to the restricted address range;
      (ix) the restricted address access detector generating an unauthorized access detection signal when the master ID signal is within the restricted address range, the master device being a malicious master when the master ID signal is within the restricted address range, the master ID signal being an unauthorized access address when the master ID signal is within the restricted address range;
      (x) the unauthorized access detection signal disabling the requested slave select signal and the conventional address decoder outputting a default slave select signal instead of the requested slave select signal;
      (xi) the interrupt controller receiving the unauthorized access detection signal from the restricted address access detector and sending an interrupt signal to the CPU;
      (xii) following receipt of the interrupt signal, the CPU initiating an interrupt service routine, the interrupt service routine determining identifying information about the malicious master and the unauthorized access address, and the interrupt service routine initiating a countermeasure, the countermeasure including activating a power gate to cut power to the malicious master;
      (xiii) storing the identifying information about the malicious master in a malicious master mask register; and,
      (xiv) if the malicious slave mask register receives a malicious slave detection signal, (A) storing identifying information about the malicious slave in the malicious slave mask register, (B) disabling the requested slave select signal, and (C) the conventional address decoder outputting the default slave select signal instead of the requested slave select signal, the default slave select signal accessing a default slave device containing empty address ranges;
   (b) securing a conventional bus arbiter, where the conventional bus arbiter receives a lock signal from the master device, the lock signal having a lock signal active time, the conventional bus arbiter being secured by:
      (i) providing a Trojan master mask register;
      (ii) providing a lock signal counter, the counter receiving the lock signal and a system clock signal, the system clock signal comprising a number of clock cycles;
      (iii) providing a lock signal comparator;
      (iv) the lock signal counter counting the number of clock cycles during the lock signal active time to determine a lock signal duration;
      (v) the lock signal comparator comparing the lock signal duration to a duration threshold;
      (vi) the comparator activating a malicious bus lock signal if the lock signal duration exceeds the duration threshold;
      (vii) the master mask register forcibly gating the lock signal upon receipt of the malicious bus lock signal;
      (viii) saving the master ID of the master device into the Trojan master mask register; and
      (ix) the conventional bus arbiter returning to a normal operation mode after the gating of the lock signal;
   (c) securing a bus matrix, the bus matrix receiving a wait request signal from the slave device having a slave ID, the wait request signal having a wait request active time, the bus matrix being secured by:
      (i) providing a wait request counter, the wait request counter receiving the system clock signal and the wait request signal, the wait request counter counting the number of clock cycles during the wait request active time to determine a wait request signal duration; and
      (ii) providing a wait request comparator, the wait request comparator comparing the wait request signal duration to a maximum duration register value; and
      (iii) when the wait request signal duration exceeds the maximum duration register value, (A) the comparator activates a malicious wait detection signal, (B) the malicious wait detection signal disables the wait request signal, and (C) the malicious wait detection signal is a latch enable signal for a malicious slave mask register to store the slave ID.

2. A method of securing a conventional address decoder connected to a CPU from a Trojan attack of a malicious master and a malicious slave, the conventional address decoder receiving an address signal from a master device having a master ID signal, the conventional address decoder outputting a, requested slave select signal to a requested slave device, the requested slave device generating a slave response signal, the method comprising the steps of:
 (a) defining a restricted address range;
 (b) a restricted address access detector comparing the master ID signal to the restricted address range;
 (c) the restricted address access detector generating an unauthorized access detection signal when the master ID signal is within the restricted address range, the master device being a malicious master when the master ID signal is within the restricted address range, the master ID signal being an unauthorized access address when the master ID signal is within the restricted address range; and
 (d) the unauthorized access detection signal disabling the requested slave select signal and the conventional address decoder outputting a default slave select signal instead of the requested slave select signal.

3. The method of claim 2, further comprising the step of a start address value residing in a restricted address start register and an end address value residing in a restricted address end register together defining the restricted address range, bounded by the start address value and the end address value.

4. The method of claim 3, further comprising the step of the restricted address access detector communicating with the restricted address start register and the restricted address end register to receive the restricted address range.

5. The method of claim 2, further comprising the step of an arbiter transmitting the master ID signal from the master device to the restricted address access detector.

6. The method of claim 2, further comprising the step of an interrupt controller receiving the unauthorized access detection signal from the restricted address access detector and sending an interrupt signal to the CPU.

7. The method of claim 6, further comprising the step of following receipt of the interrupt signal, the CPU initiating an interrupt service routine, the interrupt service routine determining identifying information about the malicious master and the unauthorized access address, and the interrupt service routine initiating a countermeasure.

8. The method of claim 7, the countermeasure including activating a power gate to cut power to the malicious master or the malicious slave.

9. The method of claim 2, further comprising the step of storing the identifying information about the malicious master in a malicious master mask register.

10. The method of claim 2, further comprising the step of a malicious slave mask register receiving the slave response signal and storing a slave ID.

11. The method of claim 10, if the malicious slave mask register receives a malicious slave detection signal, further comprising the steps of:
 (a) storing identifying information about the malicious slave in the malicious slave mask register;
 (b) disabling the requested slave select signal; and
 (c) the conventional address decoder outputting the default slave select signal instead of the requested slave select signal, the default slave select signal accessing a default slave device containing empty address ranges.

* * * * *